(12) United States Patent
Kase et al.

(10) Patent No.: US 7,106,565 B2
(45) Date of Patent: Sep. 12, 2006

(54) DIRECTIONAL GROUND RELAY SYSTEM

(75) Inventors: Takahiro Kase, Tokyo (JP); Yasutaka Sonobe, Tokyo (JP); Hidenari Amo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 604 days.

(21) Appl. No.: 10/622,695

(22) Filed: Jul. 21, 2003

(65) Prior Publication Data

US 2004/0057178 A1 Mar. 25, 2004

(30) Foreign Application Priority Data

Aug. 9, 2002 (JP) ............................. 2002-233451

(51) Int. Cl.
*H02H 3/26* (2006.01)
(52) U.S. Cl. ...................................... 361/76
(58) Field of Classification Search ................. 361/76, 361/85, 80, 81
See application file for complete search history.

(56) References Cited

U.S. PATENT DOCUMENTS

| | | | | |
|---|---|---|---|---|
| 4,371,908 A | * | 2/1983 | Andow et al. | 361/83 |
| 4,507,700 A | * | 3/1985 | Andow et al. | 361/80 |
| 4,785,249 A | * | 11/1988 | Yoshida | 324/509 |
| 4,896,241 A | | 1/1990 | Li et al. | |
| 5,699,219 A | * | 12/1997 | Arita et al. | 361/43 |
| 6,369,996 B1 | * | 4/2002 | Bo | 361/80 |
| 6,452,769 B1 | * | 9/2002 | Sohde et al. | 361/62 |
| 6,459,960 B1 | * | 10/2002 | Shuto et al. | 700/293 |
| 6,498,709 B1 | * | 12/2002 | Kurosawa et al. | 361/80 |
| 6,518,767 B1 | * | 2/2003 | Roberts et al. | 324/521 |
| 6,873,508 B1 | * | 3/2005 | Kase et al. | 361/80 |
| 6,937,453 B1 | * | 8/2005 | Kase et al. | 361/81 |
| 6,989,977 B1 | * | 1/2006 | Kase et al. | 361/80 |

FOREIGN PATENT DOCUMENTS

DE 44 18 124 A1 12/1994
EP 1 213 812 A2 6/2002

OTHER PUBLICATIONS

Electric Technology Research Association Report, vol. 37-1, no date.

* cited by examiner

*Primary Examiner*—Brian Sircus
*Assistant Examiner*—James A. Demakis
(74) *Attorney, Agent, or Firm*—Oblon, Spivak, McClelland, Maier & Neustadt, P.C.

(57) ABSTRACT

A directional ground relay (50) for receiving electric values relating to voltage and current from a power transmission line (1) to be protected. The directional ground relay may decide a direction of a fault in the power transmission line based upon the electric values. The directional ground relay comprises a zero-phase sequential current calculation unit (10-2) for calculating a zero-phase sequential current based upon the current detected from the power transmission line. The directional ground relay further comprises a phase-comparison unit (10-3) configured to compare a phase of the zero-phase sequential current to a phase of voltage corresponding to the voltage in the power transmission line, to decide whether the zero-phase sequential current is within a pre-determined range, and to output the phase of the voltage as a faulty phase of voltage, when the zero-phase sequential current is within the pre-determined range.

7 Claims, 11 Drawing Sheets

DIRECTIONAL GROUND RELAY SYSTEM

BACKGROUND OF THE INVENTION

This invention is related generally to a directional ground relay system, and more particularly to such a relay system for protecting electric power transmission system against high-resistance ground fault.

A high-resistance ground fault is generally detected by the phase relation between zero-phase sequential current and zero-phase sequential voltage as described in Electric Technology Research Association Report Volume 37-1, 1981, p. 49, 50 and 54, the entire content of which is incorporated herein by reference.

A directional ground relay of this type has a forward ground directional detecting element and a reverse ground directional detecting element. The directional ground relay sets zero-phase sequential voltage Vo as reference, and decides that there is a forward ground fault if the zero-phase sequential current Io lags −Vo, and that there is a reverse ground fault if the zero-phase sequential current Io leads to −Vo.

FIG. 21 shows the characteristic sample of a typical directional ground relay described above. In FIG. 21, "θ" denotes the highest sensitivity angle of the directional ground relay.

FIGS. 22 and 23 show examples of logic sequence circuits for tripping the circuit breaker using the outputs of the directional ground relay having a characteristics shown in FIG. 21, especially, the ground fault forward detecting element 21 which may detect a forward fault. FIG. 22 shows a case when the local circuit breaker is tripped. The logic sequence shown in FIG. 22 has a timer 12 (on-delay timer) to delay the operational output of the ground fault forward detecting element 21 for confirming the operation. Thus, the directional ground relay may be used as a backup relay. The numeral "13" denotes the trip command output signals for phases A, B and C.

FIG. 23 shows another example of a logic sequence circuit which makes a quick trip when the ground fault forward detecting element 21 is activated and a permission signal is received. In FIG. 23, the permission signal is received by a permission signal receiving unit 14, and the output of the unit 14 and the output of the timer 12 are received by an "AND" gate circuit 36. The output of the "AND" gate circuit 36 is sent out as the trip command output signal for each phase 13. The output of the timer 12 is sent to a remote terminal via a permission signal sending unit 18.

When the directional ground relay shown in FIGS. 22 or 23 is used for tripping, the setting time of the delay timer 12 for operational confirmation is set to zero second. When the directional ground relay is used as a backup relay, the setting time of the delay timer 12 is typically set to hundreds mili-seconds to several seconds.

The directional ground relay described above utilizes zero-phase sequential current Io and zero-phase sequential voltage Vo. It may decide the fault direction even at a high-resistance ground fault, but it may not decide the faulty phase. However, since the fault current is small at a high-resistance ground fault, tripping all phases including healthy phases at same time as the faulty phase would affect the whole power system more severely than letting the fault continuing. Thus, when a circuit breaker is tipped for a high-resistance ground fault, only the faulty phase should be tripped. Besides, when the ground resistance is very high, zero-phase sequential voltage Vo may be very small, and the fault direction may not be decided.

BRIEF SUMMARY OF THE INVENTION

Accordingly, it is an advantage of the present invention to provide an improved ground fault relay and an improved ground fault relay system, which may decide the direction of the fault even at a high-resistance ground fault, and which trip only the phase of the fault.

There has been provided, in accordance with an aspect of the present invention, a directional ground relay configured to receive electric values relating to voltage and current from a three-phase electric power transmission line to be protected. The directional ground relay is configured to decide a direction of a fault in the power transmission line based upon the electric values. The directional ground relay comprises a zero-phase sequential current calculation unit configured to calculate a zero-phase sequential current based upon the current detected from the power transmission line. The directional ground relay further comprises a phase-comparison unit configured to compare the phase of the zero-phase sequential current to the phase of any phase voltage, to decide whether the phase of the zero-phase sequential current is within a pre-determined range, and to output the phase of the voltage as a faulty phase of voltage in which a forward ground fault has occurred, when the phase of the zero-phase sequential current is within the pre-determined range.

There has also been provided, in accordance with another aspect of the present invention, a directional ground relay system comprising a directional ground relay configured to calculate a zero-phase sequential current and a zero-phase sequential voltage based upon electric values relating to voltage and current detected from a three-phase electric power transmission line to be protected. The directional ground relay is configured to decide a direction of a ground fault in the power transmission line based upon a phase relation of the zero-phase sequential current and a zero-phase sequential voltage. The system further comprises an sudden current-change relay configured to be activated when a phase current has changed at a rate more rapid than a pre-determined rate. The system further comprises a faulty phase decision unit configured to decide that a phase corresponding to the activated sudden current-change relay is a phase in which the fault has occurred, when the ground fault is decided to be a forward fault by the directional ground relay.

There has also been provided, in accordance with another aspect of the present invention, a directional ground relay system comprising: a first directional ground relay configured to receive electric values relating to voltage and current from a three-phase electric power transmission line to be protected. The directional ground relay is configured to decide a direction of a fault in the power transmission line based upon the plurality of electric values. The directional ground relay comprises: a zero-phase sequential current calculation unit configured to calculate a zero-phase sequential current based upon the current detected from the power transmission line; and a phase-comparison unit configured to compare a phase of the zero-phase sequential current to a phase of voltage corresponding to the voltage in the power transmission line, to decide whether the zero-phase sequential current is within a pre-determined range, and to output the phase of the voltage as a faulty phase of voltage in which a forward ground fault has occurred, when the zero-phase sequential current is within the pre-determined range. The system further comprises a second directional ground relay configured to calculate a zero-phase sequential current and a zero-phase sequential voltage based upon electric values relating to voltage and current detected from the power transmission line. The directional ground relay is configured to decide a direction of a ground fault in the power transmission line based upon a phase relation of the zero-phase sequential current and a zero-phase sequential voltage. The system further comprises a faulty phase decision unit configured to decide that a phase in which the first ground directional relay is activated is a faulty phase, when the second directional ground relay decides a forward fault.

There has also been provided, in accordance with another aspect of the present invention, a directional ground relay system comprising: a directional ground relay configured to calculate a zero-phase sequential current and a zero-phase sequential voltage based upon electric values relating to voltage and current detected from a three-phase electric power transmission line to be protected The directional ground relay is configured to decide a direction of a ground fault in the power transmission line based upon a phase relation of the zero-phase sequential current and a zero-phase sequential voltage. The system comprises a transmitter and a receiver configured to exchange signals between a local terminal and a remote terminal, and an sudden current-change relay configured to be activated when a phase current has changed at a rate more rapid than a pre-determined rate. The system is configured to output a trip signal to an activated phase of the sudden current-change relay of the local terminal and to transmit a permission signal to the remote terminal when a permission signal is received from a relay of the remote terminal of a local terminal to the output phase of the sudden current-change relay and to transmit a permission signal to the remote terminal, if a permission signal is received from a relay of the remote terminal, and if the directional ground relay has not detected a reverse fault.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 1:
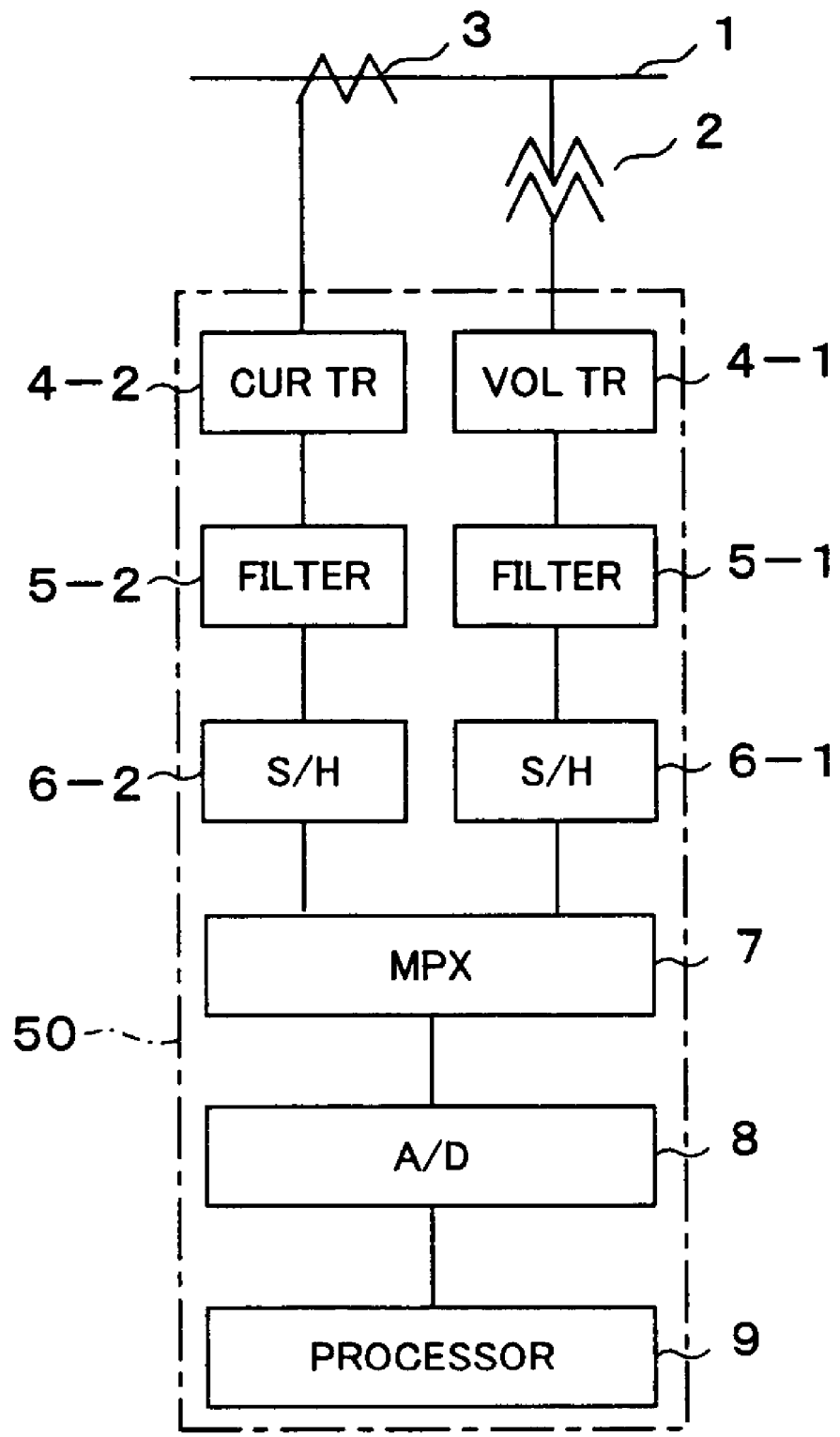
FIG. 1 is a block diagram showing a protective relay system which may be commonly used in combination with various embodiments according to the present invention.

In the following description and also in the above description of background of the invention, like reference numerals represent like elements, and redundant description may be omitted.

FIG. 1 is a block diagram showing hardware construction of a protective relay system which may be applied to various embodiments of the ground fault protective relay system of the present invention described below.

Referring to FIG. 1, a ground fault protective relay 50 is connected to a three-phase AC power transmission line 1 via a power transformer 2 for detecting voltage and a current transformer 3 for detecting current. The relay 50 includes a voltage transformer 4-1 and a current transformer 4-2 which convert the voltage output detected by the power transformer 2 and the current output detected by the current transformer 3, respectively, into proper levels so that the detected outputs may be handled by a digital processor 9.

The voltage transformer 4-1 and the current transformer 4-2 also function to electrically isolate the power transformer 2 and the current transformer 3, respectively, from the electronic circuit in the relay 50.

The relay 50 also includes analogue filters 5-1 and 5-2 for cutting off high frequency components from the outputs of the voltage transformer 4-1 and the current transformer 4-2, respectively. The relay 50 further includes sample holders 6-1 and 6-2 which sample the outputs of the analogue filters 5-1 and 5-2, respectively, periodically and which hold the sampled data.

The relay 50 further includes a multiplexer (MPX) 7 which receives the outputs of the sample holders 6-1 and 6-2 and rearrange the data sequentially, and an analogue-to-digital converter (A/D) 8 which converts the output of the multiplexer 7 into a digital signal. The relay 50 further includes a digital processor 9 such as a micro-computer which processes the output of the analogue-to-digital converter 8.

[First Embodiment]

Figure 2:
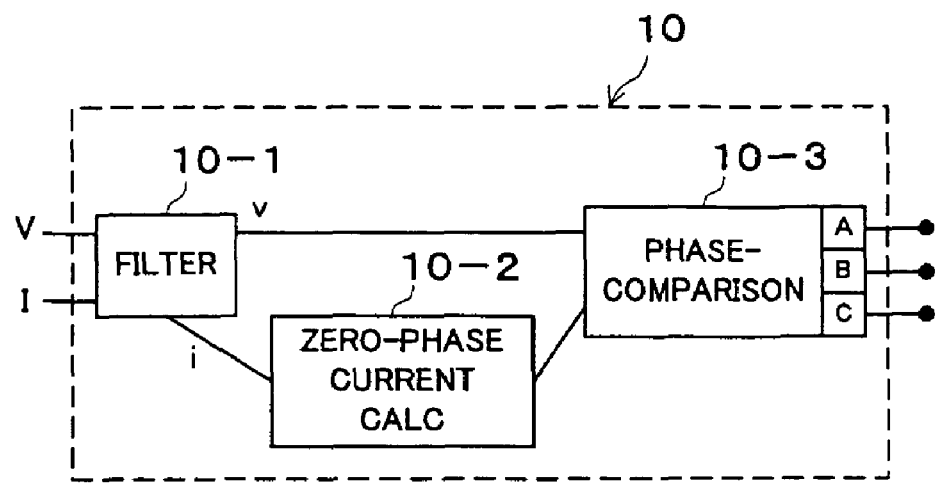
FIG. 2 is a block diagram showing functional processing units of a first embodiment of a directional ground relay according to the present invention.

FIG. 2 is a block diagram showing functional processing units of a first embodiment of a directional ground relay according to the present invention. This directional ground relay may be implemented using the digital processor 9 shown in FIG. 1. Referring to FIG. 2, a directional ground relay is generally indicated at 10. The relay 10 has a digital filter 10-1, which receives the digital signals of voltage "V" and current "I" from the analogue-to-digital converter 8, and outputs filtered signals of "v" and "i", respectively.

The directional ground relay generally 10 also has a zero-phase sequential current calculation unit 10-2, which calculates zero-phase sequential current component "3Io" from the current "i" which is an output of the digital filter 10-1, using Equation (1) shown below:

$$3I_{0m} = i_{Am} + i_{Bm} + i_{Cm} \quad (1)$$

wherein suffix "m" denotes a standard sampling time. Sampling data are assumed to be taken every 30 degrees of an AC cycle.

The directional ground relay generally 10 also has a phase-comparison unit 10-3, which compares the phases of voltage of each phase $V_A$, $V_B$ and $V_C$ to the zero-phase sequential current Io received from the zero-phase sequential current calculation unit 10-2, and decides whether the calculated results is within an operational region or not. The phase-comparison unit 10-3 may use cosine of the phase angle between Io and $V_A$, for example, in Formula (2) as follows:

$$I_{0m} * V_{Am} = |I_0|_m |V_A|_m \cos \phi = I_{0m} V_{Am} + I_{0(m-3)} V_{A(m-3)} \leq |I_0|_m |V_A|_m \cos \theta \quad (2)$$

wherein "*" denotes an inner product operation, "φ" denotes a phase difference between voltage and current, and "θ" denotes a setting value. |Io| and |$V_A$| may be calculated by the following equations, for example:

$$|I_0|_m = \sqrt{I_{0m}^2 + I_{0(m-3)}^2}$$

$$|V_A|_m = \sqrt{V_{Am}^2 + V_{A(m-3)}^2} \quad (3)$$

Phase comparison between the zero phase current Io and the B-phase voltage $V_B$ as well as phase comparison between the zero phase current Io and the C-phase voltage $V_C$ may be implemented likewise.

Alternatively, the outer product operation may be utilized instead of the inner product operation shown in Formula (2).

The phase-comparison unit 10-3 further outputs the corresponding voltage phase as the phase in which a forward fault has occurred, when any of the phases are calculated to be decided to have entered the shaded zones shown in FIG. 3, which will be described in detail below. "A", "B" and "C" in the phase-comparison unit 10-3 shown in FIG. 2 each denotes an output terminal for outputting calculated result for each phase.

Figure 3:
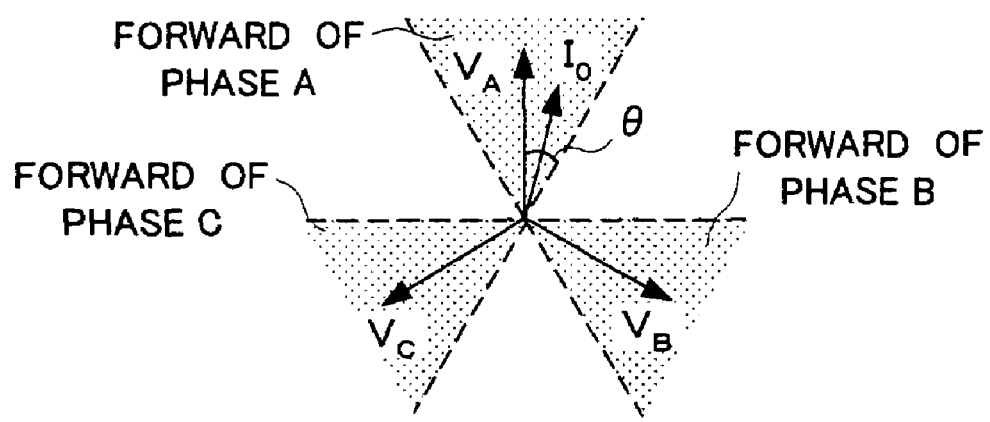
FIG. 3 is a characteristic diagram of the first embodiment of the directional ground relay according to the present invention.

Referring to the characteristic diagram of FIG. 3, in case of a ground fault due to metal contact where fault impedance is negligibly small in stead of a high-resistance ground fault, the zero-phase sequential current Io would mainly depends upon the component of the line impedance which is Z=j ω L+R; wherein "j" is an imaginary unit, "ω" is the angular frequency, "L" is the reactance, and "R" is the resistance. Since R is negligibly small compared to ω L, the zero-phase sequential current Io is delayed approximately 90 degrees behind the faulty phase voltage.

However, in a high-resistance ground fault to which the present invention is effective, the resistance component is larger compared to a ground fault due to metal contact. Thus, the phases of the fault voltage and the zero-phase sequential current Io would become closer together, and the faulty phase may be decided as described above.

Alternatively, line voltages may be utilized for calculation of polarizing voltages as well known in the art in stead of the voltage of each phase $V_A$, $V_B$ and $V_C$ which are utilized in the embodiment described above. In such a case, the voltage corresponding to (or equivalent to) the voltage of phase "A", $V_A$, may be obtained by Equation (4) as follows:

$$V_{Am}' = \alpha V_{Am} - \beta (V_{Bm-3} - V_{Cm-3}) \quad (4)$$

wherein "α" and "β" are arbitrary constants.

According to the first embodiment of the directional ground relay described above, high-resistance ground fault may be detected which could not be detected by conventional techniques. Besides, faulty phase may be decided by the first embodiment of the directional ground relay.

Figure 4:
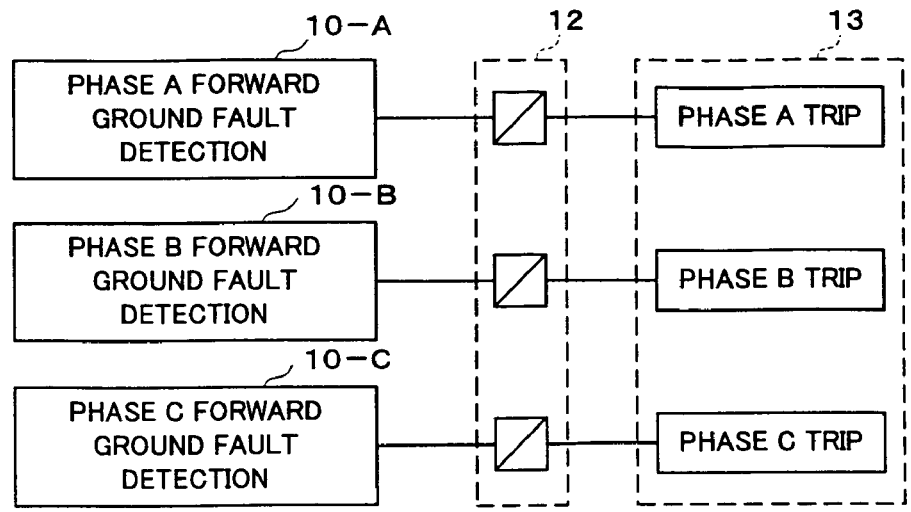
FIG. 4 is a block diagram showing a first example of a logic sequence circuit for generating trip command signals in combination with various embodiments of directional ground relays according to the present invention.
Figure 5:
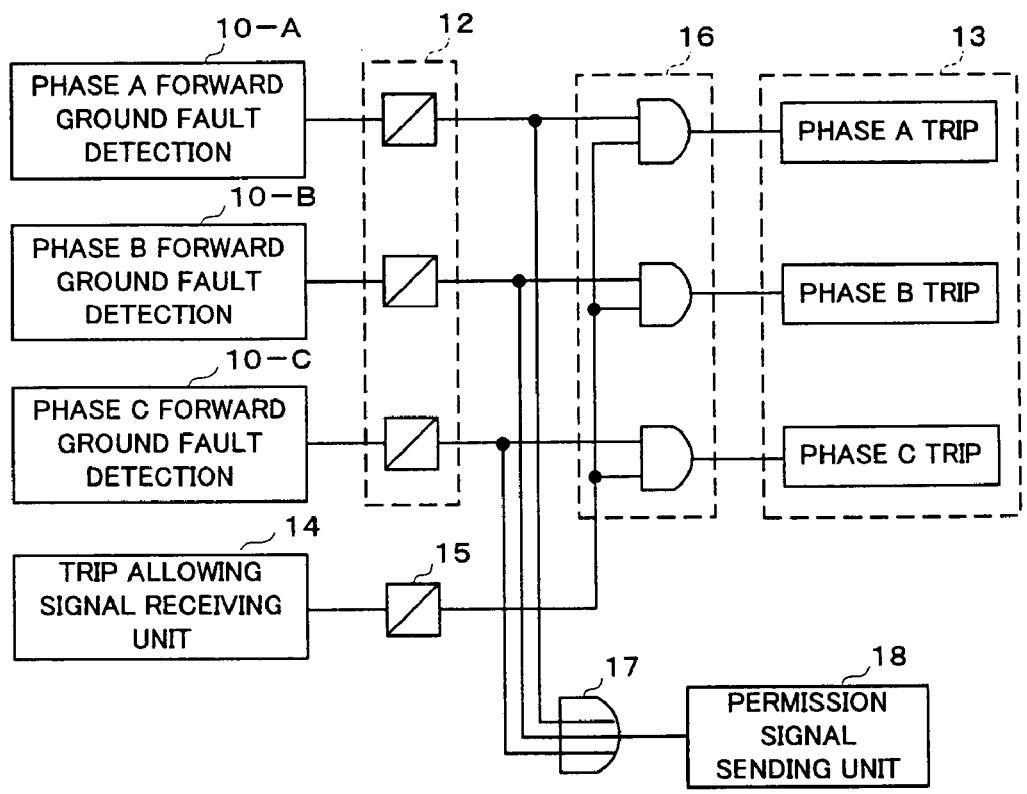
FIG. 5 is a block diagram showing a second example of a logic sequence circuit for generating trip command signals in combination with embodiments of directional ground relays according to the present invention.

FIGS. 4 and 5 are block diagrams showing different examples of logic sequence circuits for generating trip command signals. These logic sequence circuits may be applied not only to the first embodiment of the present invention but to other embodiments.

FIG. 4 shows a logic sequence circuit which generates trip command signals based upon the local terminal itself. The output terminal for each phase of the directional ground elements 10-A, 10-B and 10-C is connected to a corresponding timer 12 for confirmation. The setting times for the confirmation timers 12 may be set hundreds mili-seconds to several seconds, for example, when the directional ground elements 10-A, 10-B and 10-C are used for backup protection. The setting times for the confirmation timers 12 may be set zero, which means the confirmation timers 12 are short-circuited, when the directional ground elements 10-A, 10-B and 10-C are used for instantaneous tripping. The timers 12 each output trip command output signal 13 for each phase of the local circuit breaker.

FIG. 5 shows another logic sequence circuit for generating trip command signals. This logic sequence circuit communicates with a remote terminal for exchange mutual permission signals, so that the condition of the remote terminal may be considered when the trip is decided. A permission signal receiving unit 14 receives a permission signal from the remote terminal (not shown). The output of the permission signal receiving unit 14 as well as the outputs of the timers 12 are received by "AND" gates 16. If a permission signal is received from the remote terminal when the directional ground elements 10-A, 10-B or 10-C have been activated or when a forward ground fault has been detected, the circuit breaker of the corresponding phase of the local terminal is allowed to trip.

An "OR" gate circuit 17 also receives the outputs of the timers 12. When at least one of the directional ground elements 10-A, 10-B or 10-C decides a forward fault in a phase of A, B or C at the local terminal, the "OR" gate circuit 17 outputs a command signal to a permission signal sending unit 18. Then, the unit 18 sends a permission signal to the remote terminal.

Figure 6:
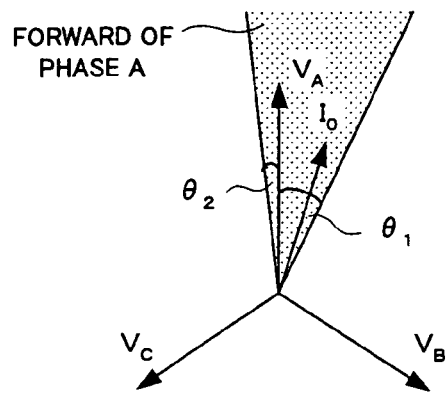
FIG. 6 is a characteristic diagram of a modification of the first embodiment of the directional ground relay according to the present invention.

Now a modification of the first embodiment is described which is modified in functions. The functional block diagram of this modification is the same as that of the first embodiment shown in FIG. 2. In this modification, the operational region on the advance side to the phase voltage is narrowed ($\theta_1 > \theta_2$) as shown in FIG. 6 compared to the case shown in FIG. 3. This is because the zero-phase sequential current Io would rarely advance to the phase voltage $V_A$. The delay-side operational region may be set wider by setting the advance-side operational region narrower. Thus, detection operational region as a directional ground relay may be broadened.

Calculation method for this case is similar to the one shown in FIG. 3. For example, outer product is utilized as shown in Formula (5):

$$-|I_0|_m |V_A|_m \sin \theta_2 \leq |I_0|_m |V_A|_m \sin \phi = I_{Om} V_{A(m-3)} + I_{0(m-3)} V_{Am} \leq |I_0|_m |V_A|_m \sin \theta_1 \quad (5)$$

Now a method for detecting a reverse fault utilizing this modification of the directional ground relay is discussed.

When this directional ground relay is used for backup protection purpose, reverse fault detection is rarely needed. However, when the directional ground relay in combination with a communication device for protection relay is used for tripping by permission signals sent from the remote terminal, reverse fault detection is needed.

Figure 7:
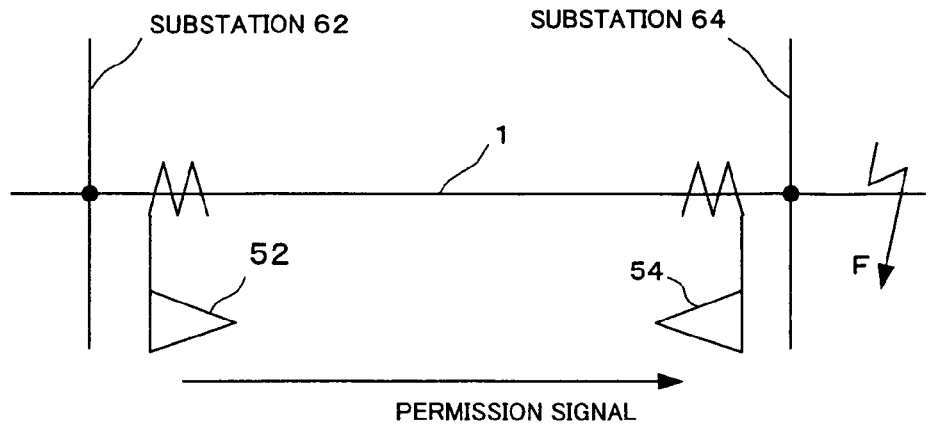
FIG. 7 is a schematic diagram showing the relation between a fault location and permission signal transmission.

FIG. 7 shows an example of relation between the locations of first and second directional ground relays 52 and 54 of first and second substations 62 and 64, respectively, and a fault location F. If a fault F has occurred reverse of the second substation 64 as shown in FIG. 7, the first relay 52 of the first substation 62 would detect it as a forward fault and send a permission signal to the second relay 54 of the second substation 64. Suppose the second substation 64 has a directional ground relay and a reverse detecting distance relay, and suppose the sensitivity of the first directional ground relay 52 is higher than the reverse detection element of the reverse distance relay of the terminal at the second substation. If the second relay 54 failed to detect a reverse fault in this case, the second relay 54 may erroneously trip based upon the permission signal from the first relay 52. The tripping logic sequence circuit of this embodiment may be configured to generate a permission signal if a permission signal is received from the remote terminal when the local terminal may not detect the fault.

Therefore, a reverse fault detecting element with a similar sensitivity level as for forward fault detection is needed.

Figure 8:
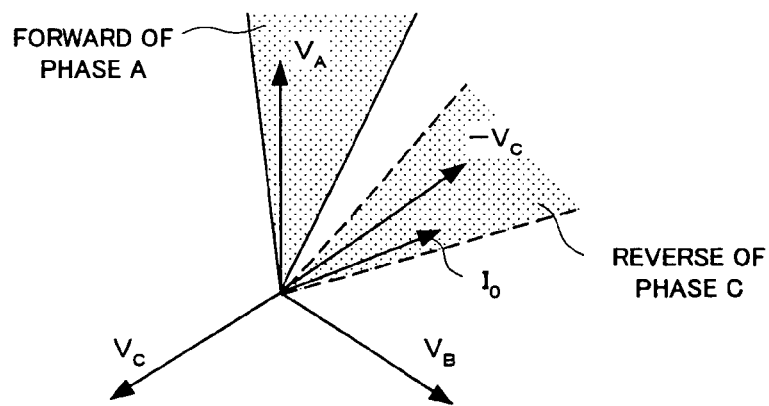
FIG. 8 is a characteristic diagram of a reverse detection directional ground relay required for the first embodiment of the present invention.

FIG. 8 is a characteristic diagram of a reverse detection element which may satisfy the above-described needs. FIG. 8 shows reverse operational region of C-phase voltage as an example. Calculation of the reverse fault detection element is conducted by using "$-V_C$" as the voltage.

According to the modification of the first embodiment described above, the phase of the fault is decided and tripped in the internal fault even in the case of high-resistance ground fault, which could not be detected by the prior art, by utilizing the reverse fault detection element and the permission signal which is sent from the remote terminal.

[Second Embodiment]

Figure 9:
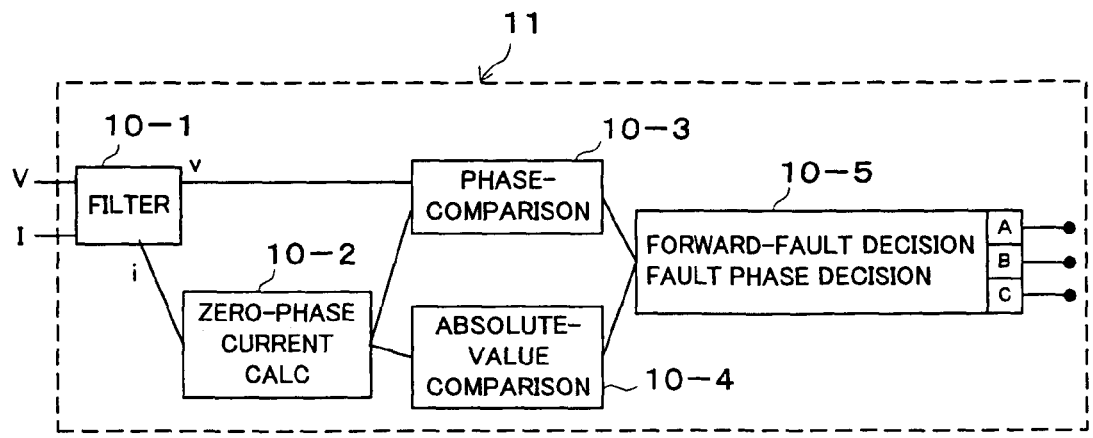
FIG. 9 is a block diagram showing functional processing units of a second embodiment of a directional ground relay according to the present invention.

FIG. 9 is a block diagram showing functional processing units of a second embodiment of a directional ground relay according to the present invention. A directional ground relay 11 of the second embodiment has a digital filter 10-1, a zero-phase sequential current calculation unit 10-2 and a phase-comparison unit 10-3, which are same as those of the directional ground relay 10 of the first embodiment shown in FIG. 2. In addition, the directional ground relay 11 has an absolute-value comparison unit 10-4 which may receive the outputs of the zero-phase sequential current calculation unit 10-2, and which may calculate absolute value of the zero-phase sequential current. The directional ground relay 11 also has a forward-fault decision unit 10-5 which may receive the outputs of the phase-comparison unit 10-3 and the absolute-value comparison unit 10-4, and which may decide whether an "AND" condition is satisfied.

The absolute-value comparison unit 10-4 may decide whether the zero-phase sequential current Io is equal to or greater than a threshold value of $I_k$ by Formula (6) as follows, for example:

$$|I_0|_m^2 = I_{0m}^2 + I_{0(m-3)}^2 \geq I_k^2 \quad (6)$$

The forward-fault decision unit 10-5 may decide that there has been a forward ground fault only when the operational conditions for the phase-comparison unit 10-3 and the absolute-value comparison unit 10-4 are both established.

Figure 10:
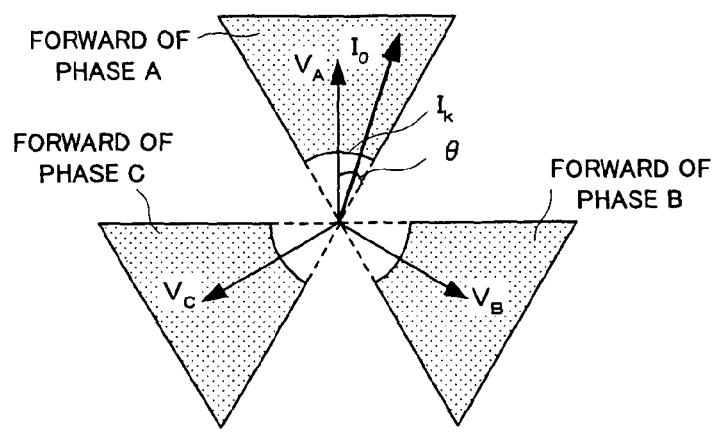
FIG. 10 is a characteristic diagram of the directional ground relay of the second embodiment according to the present invention.

The operational regions of the directional ground relay 11 of the second embodiment shows the condition that the absolute value of the zero-phase sequential current Io is equal to or greater than a setting value of $I_k$ and the phase of it is within certain regions compared to the phase voltage, as shown in the shaded regions in FIG. 10.

The directional ground relay of the second embodiment described above may be insensitive to input errors and may select the faulty phase for a high-resistance fault.

[Third Embodiment]

Figure 11:
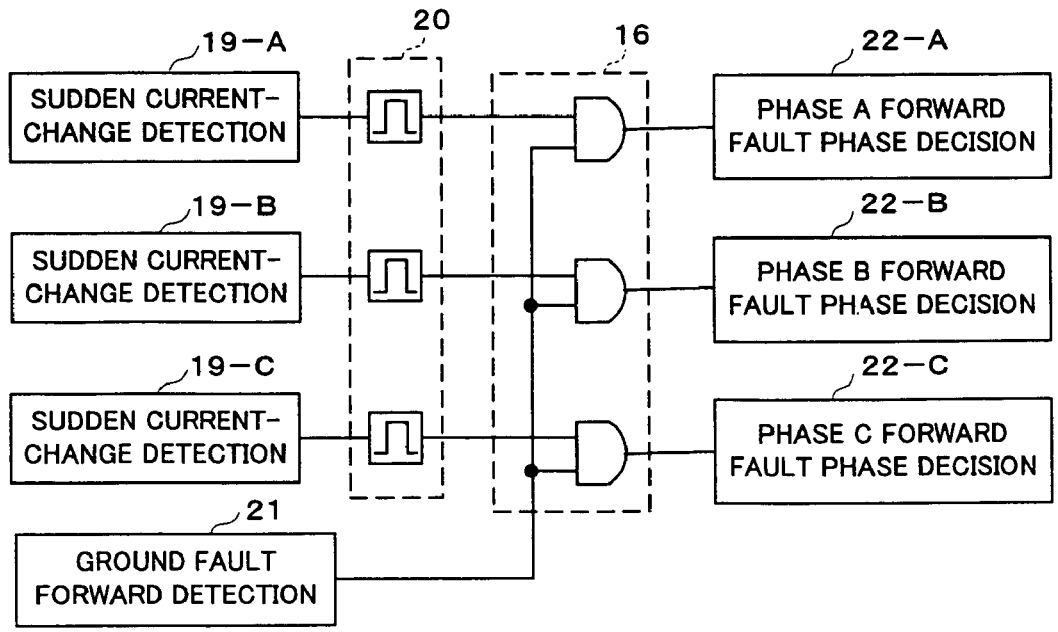
FIG. 11 is a block diagram showing a logic sequence circuit for generating forward faulty phase decision signals in a third embodiment of the present invention.
Figure 12:
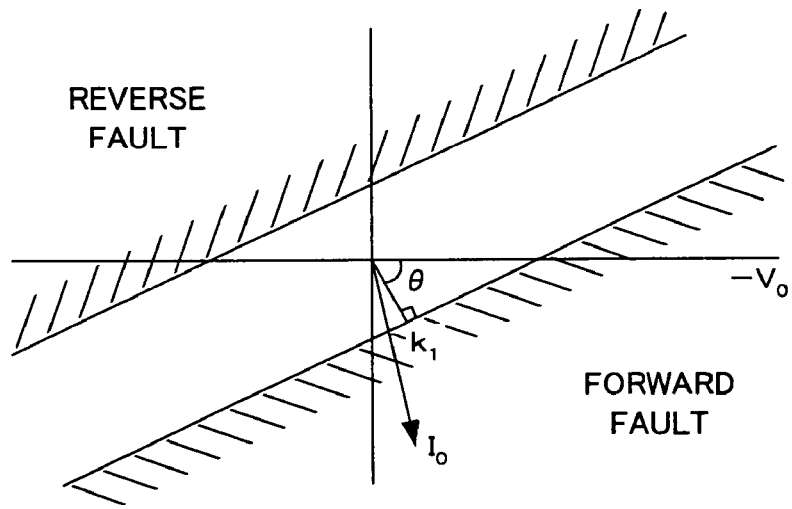
FIG. 12 is a characteristic diagram of the reverse detection directional ground relay used in the third embodiment according to the present invention.

A third embodiment according to the present invention is described referring to FIGS. 11 and 12. FIG. 11 is a block diagram showing a logic sequence circuit for generating forward faulty phase decision signals in a third embodiment. Sudden current-change elements 19-A, 19-B and 19-C may detect changes in currents. The sudden current-change elements 19-A, 19-B and 19-C are sensitive and may detect the phase in which the high-resistance fault has occurred. The sudden current-change elements 19-A, 19-B and 19-C may detect a change by the difference between the absolute value of the current $I_m$ at a base sampling point (m) and the absolute value of the current $I_{m-12}$ at a sampling point (m−12) which is 1 cycle prior to the base sampling point, as shown in Formula (7) as follows:

$$|\Delta I|_m = ||I_m| - |I_{m-12}|| \geq K \quad (7)$$

wherein K is a constant corresponding to the sensitivity.

As shown in FIG. 11, the outputs of the sudden current-change elements 19-A, 19-B and 19-C may be received by one-shot timers 20, which sustain the outputs of the sudden current-change elements 19-A, 19-B and 19-C for a predetermined time period once the sudden current-change elements 19-A, 19-B and 19-C have been activated.

Figure 21:
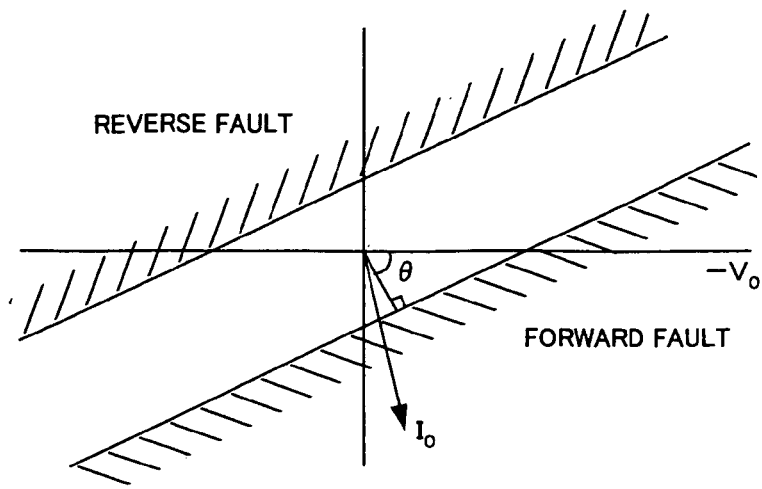
FIG. 21 is a characteristic diagram of a directional ground relay of prior art.
Figure 22:
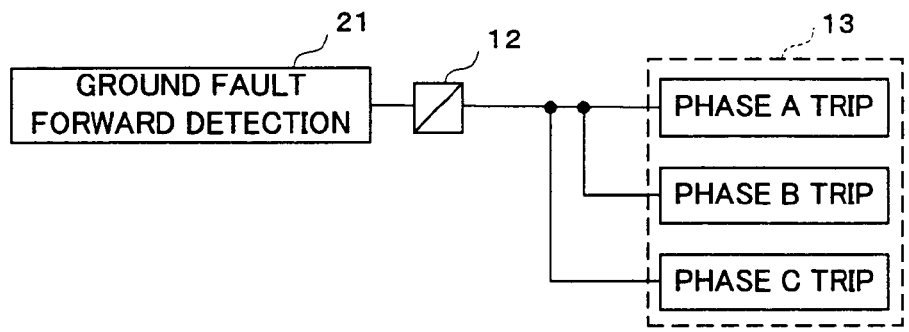
FIG. 22 is a block diagram showing a first example of a logic sequence circuit of prior art for generating trip command output signals.
Figure 23:
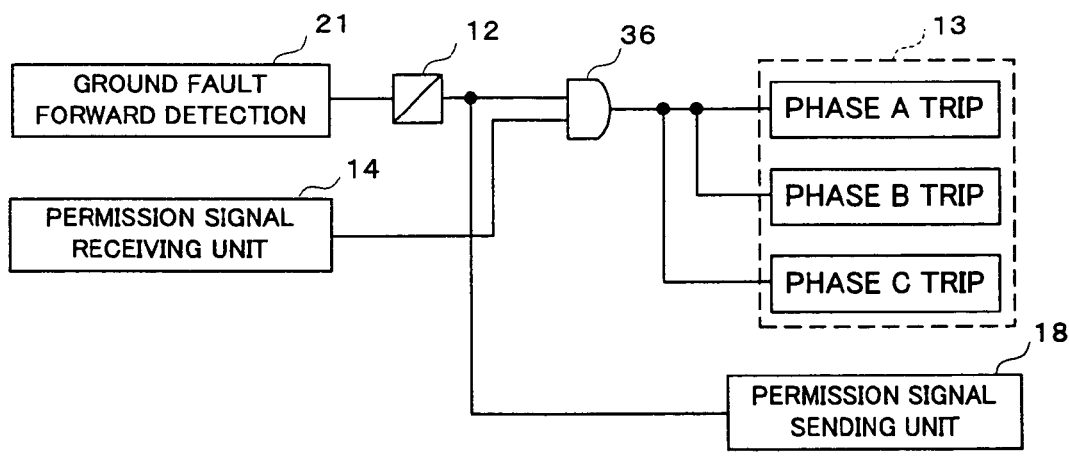
FIG. 23 is a block diagram showing a second example of a logic sequence circuit of prior art for generating trip command output signals.

The numeral "21" in FIG. 11 denotes a directional ground relay which may use the zero-phase sequential current Io and the zero-phase sequential voltage Vo as described referring to FIGS. 21 and 22. The relay 21 is used as a ground fault forward decision element here. The relay 21 may have a characteristic shown in FIG. 12 which is similar to that of the prior art shown in FIG. 21. The relay 21 may decide the direction of the fault but may not decide the phase of the fault, in a case of a high-resistance fault. FIG. 12 also shows a maximum sensitivity angle θ and a constant k1 for deciding the sensitivity of the zero-phase sequential current at the maximum sensitivity.

The outputs of the relay 21 as well as of the one-shot timers 20 may be received by "AND" gate circuits 16 for deciding high-resistance ground faulty phase, as shown in FIG. 11. The "AND" gate circuits 16 detect the high-resistance ground faulty phase when either of the sudden current-change elements 19-A, 19-B and 19-C is activated, and while an operational output from the one-shot timer 20 is sustaining, and when the forward directional ground relay 21 is activated.

The "AND" gate circuits 16 may output forward fault decision result signals 22-A, 22-B and 22-C, each for each phase.

According to the third embodiment described above, forward detecting element 21 of the directional ground relay of the prior art, which is operated by the zero-phase sequential current Io and the zero-phase sequential voltage Vo, is used as a direction decision element. Then, the third embodiment may detect the forward fault direction and the phase of the fault at a high-resistance fault, in combination with the sudden current-change relays. Then, only the phase of the fault may be tripped.

[Fourth Embodiment]

Figure 13:
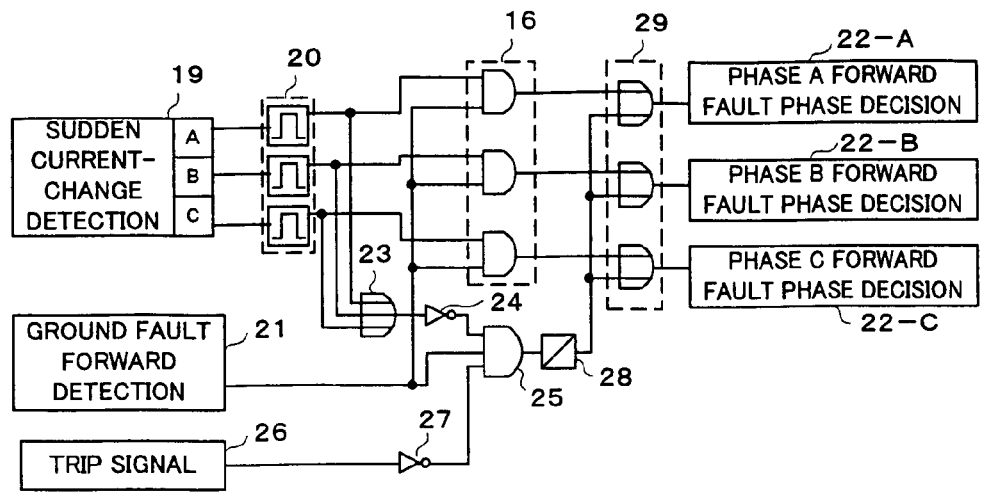
FIG. 13 is a block diagram showing a logic sequence circuit for generating forward faulty phase decision signals in a fourth embodiment according to the present invention.

A fourth embodiment according to the present invention is described referring to FIG. 13. In the fourth embodiment, some logic elements described below have been added to the third embodiment shown in FIG. 11, so that forward fault direction in each phase may be decided. The outputs of the sudden current-change elements 19-A, 19-B and 19-C, which are generally denoted by a numeral "19", may be received by the one-shot timers 20, and the outputs of the one-shot timers 20 may be received by an "OR" gate circuit 23. Thus the "OR" gate circuit 23 generates an output when either of the sudden current-change elements 19-A, 19-B and 19-C are activated. The output of the "OR" gate circuit 23 is received by a "NOT" gate circuit 24, which generates an operational signal when none of the sudden current-change elements 19-A, 19-B and 19-C are in operational condition. The output of the "NOT" gate circuit 24 is received by an "AND" gate circuit 25 described in detail below.

A trip signal 26 becomes an operational output of "1" when a trip command is output for any one of the phases at the local terminal. The trip signal 26 is received by the "AND" gate circuit 25 via a "NOT" gate circuit 27. The "AND" gate circuit 25 receives the output of the forward fault detection element 21 of the directional ground relay as well as the outputs of the "NOT" gate circuits 24 and 27. The "AND" gate circuit 25 generates an operational output if none of the phases of the sudden current-change elements 19-A, 19-B and 19-C are in operational condition, if the trip signal 26 is activated, and if only the forward fault detection element 21 of the directional ground relay is activated.

The output of the "AND" gate circuit 25 is received by a confirmation timer 28. The confirmation timer 28 is introduced to prevent that a trip condition be established in healthy phases after a single phase is chosen and tripped by the "AND" gate circuit 16 at the high-resistant ground fault. Numeral "29" denotes "OR" gate circuits. The "OR" gate circuits 29 output the forward fault decision result signals for respective phases in response to the corresponding "AND" gate circuits 16, without modification. The "OR" gate circuits 29 also output the forward ground fault decision result signals when a time period set by the confirmation timer 28 has passed after the "AND" gate circuit 25 started operation.

According to the fourth embodiment, when an sudden current-change relay is activated and a forward ground fault is detected by the directional ground relay, only the faulty phase is tripped. However, if the sudden current-change relay are not activated, when only the forward ground fault detecting relay is activated, and when no trip signal is available, then, all three phases are decided to be in faults, and trip output is commanded.

[Fifth Embodiment]

Figure 14:
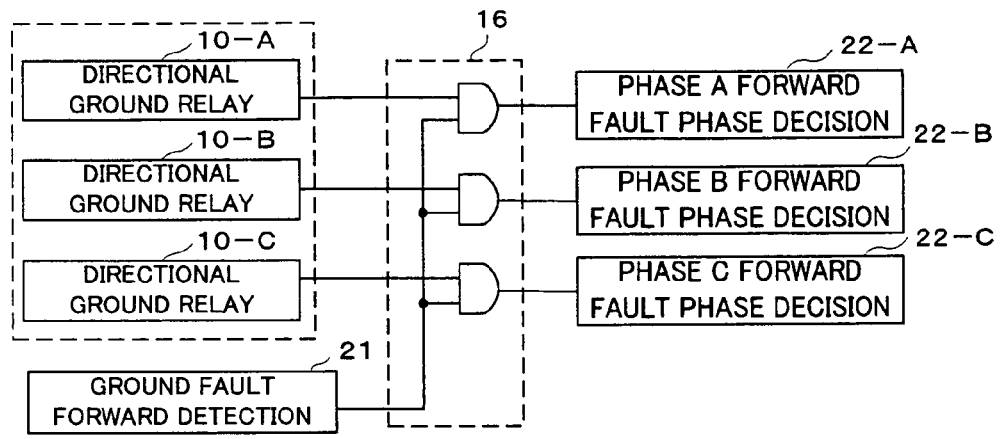
FIG. 14 is a block diagram showing a logic sequence circuit for generating forward faulty phase decision signals in a fifth embodiment according to the present invention.
Figure 15:
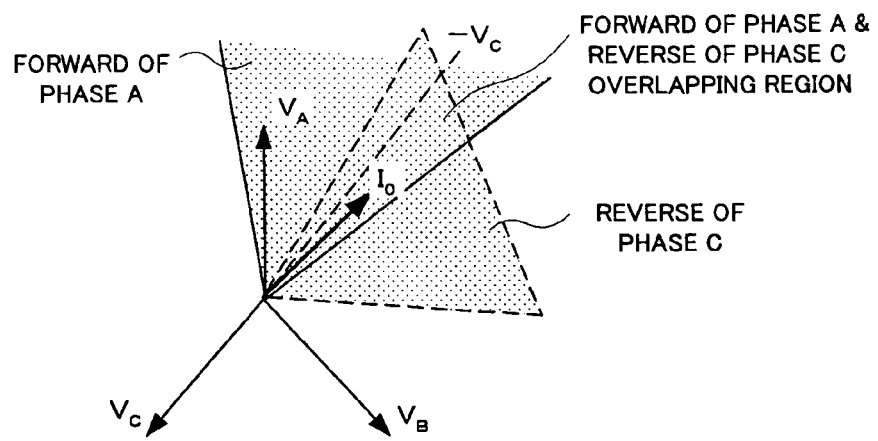
FIG. 15 is a characteristic diagram showing the effect of the fifth embodiment of the directional ground relay system.

A fifth embodiment according to the present invention is described referring to FIGS. 14 and 15. In the fifth embodiment, the sudden current-change elements 19-A, 19-B and 19-C which are used as faulty phase decision elements in the third and fourth embodiments have been replaced by directional ground elements 10-A, 10-B and 10-C which were described as the directional ground elements 10 in the first embodiment.

The other features are substantially same as the third embodiment shown in FIG. 11. The directional ground elements 10-A, 10-B and 10-C shown in FIG. 2 have not only faulty phase decision function but also fault directional decision function. When this type of directional ground elements 10-A, 10-B and 10-C are used for faulty phase decision elements, the operational range of a protection relay system may be broadened.

FIG. 15 shows a broadened operational range of a faulty phase decision element. When the operational range is broadened, the forward decision operational range of a phase and the reverse decision operational range of an advanced phase may partly overlap, as shown in FIG. 15. When the zero-phase sequential current Io is in the overlapped region, the fault directional decision may not be possible in general. However, since this embodiment has a separate directional ground relay 21, when the directional ground relay 21 decides a forward fault, a forward fault of Phase A may be decided. Likewise, when the directional ground relay 21 decides a reverse fault, a reverse fault of Phase C may be decided.

[Sixth Embodiment]

Figure 16:
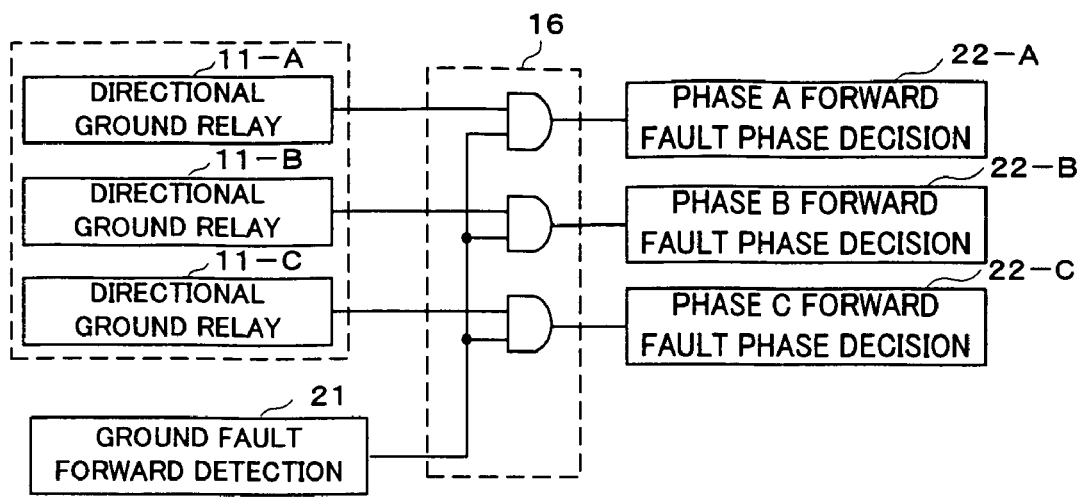
FIG. 16 is a block diagram showing a logic sequence circuit for generating forward faulty phase decision signals in a sixth embodiment according to the present invention.

A sixth embodiment according to the present invention is described referring to FIG. 16, which is a block diagram showing a logic sequence circuit for generating forward faulty phase decision signals. In the sixth embodiment, the directional ground relays 11-A, 11-B and 11-C which have been described as the directional ground relays 11 in the second embodiment (FIG. 9) are used as faulty phase decision elements in the fifth embodiment (FIG. 14). The other features are substantially same as the fifth embodiment shown in FIG. 14.

In the sixth embodiment, since the directional ground relays 11-A, 11-B and 11-C which have been described in the second embodiment are used as faulty phase decision elements, only a high-resistance ground fault having a zero-phase sequential current Io equal to or greater than a certain value of $I_k$ is decided. Faulty phase decision and direction decision with high resistance to noises and errors may be provided.

[Seventh Embodiment]

Figure 17:
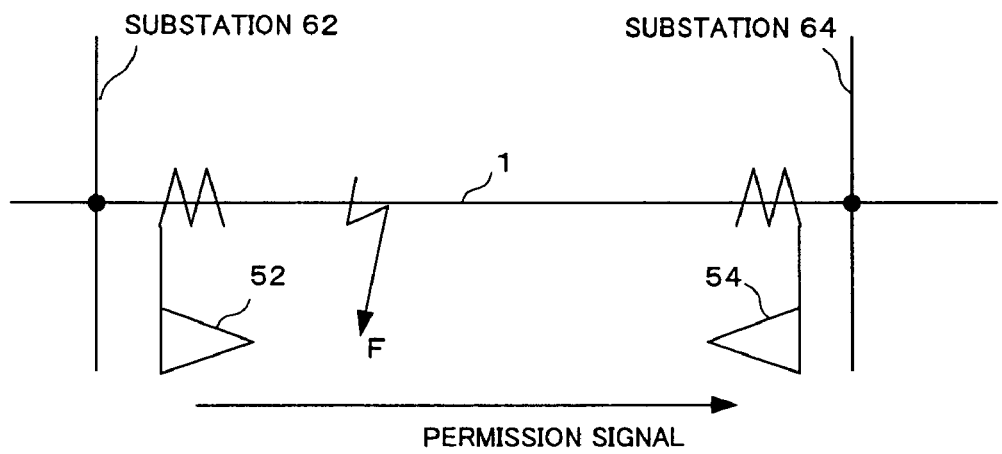
FIG. 17 is a schematic diagram showing a fault situation where it is difficult to handle with the sixth embodiment according to the present invention.
Figure 18:
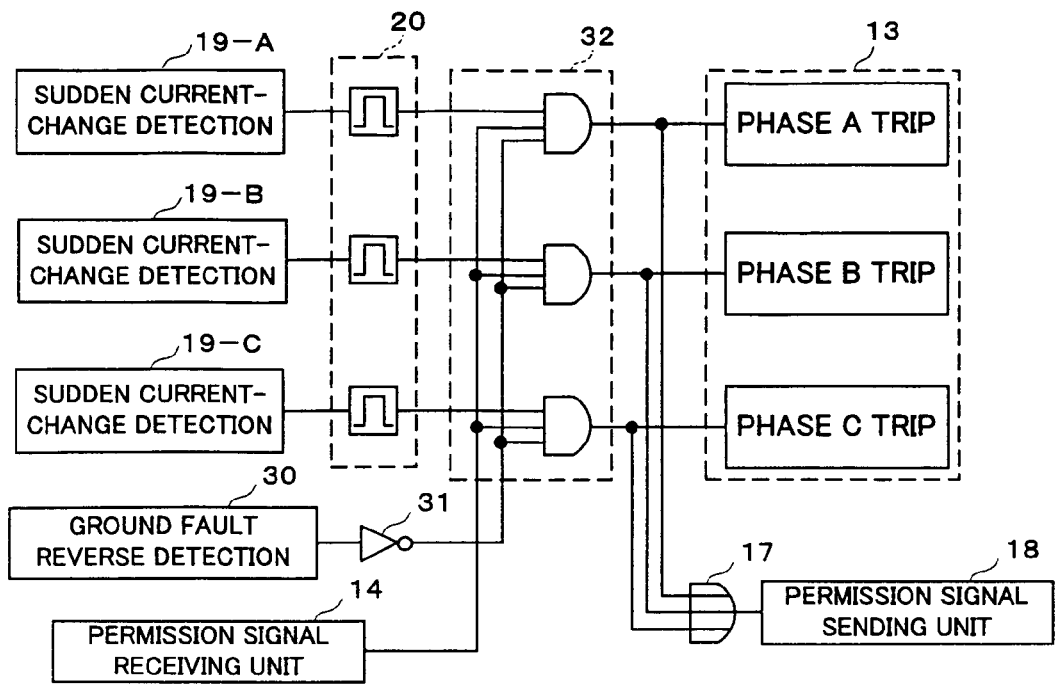
FIG. 18 is a block diagram showing a logic sequence circuit for generating trip command output signals in a seventh embodiment according to the present invention.

A seventh embodiment according to the present invention is described referring to FIGS. 17 and 18.

In the fifth embodiment (FIG. 16) described above, when a high-resistance fault has occurred at an internal point close to the first substation 52, it is difficult to detect the fault at the second relay 54 at the remote terminal in the second substation 64. Especially, it is almost impossible to detect the fault at the second relay 54 when the transmission line 1 between the location of the fault F and the second relay 54 is long. Such a problem of the sixth embodiment may be alleviated by the seventh embodiment as shown in FIG. 18.

FIG. 18 is a block diagram showing a logic sequence circuit for generating trip command output signals in the seventh embodiment. Referring to FIG. 18, the numeral "30" denotes a ground fault reverse detection element which a common ground directional relay for detecting fault direction by zero-phase sequential current Io and zero-phase sequential voltage Vo, as described above referring to FIG. 12, for example. The output of the ground fault reverse detection element 30 is received by a "NOT" gate circuit 31, which generates an operational output of "1" when the ground fault reverse detection element 30 is not detecting a reverse ground fault.

The outputs of the sudden current-change elements 19-A, 19-B and 19-C, as well as the outputs of the permission signal receiving unit 14 and of the "NOT" gate circuit 31, are received by "AND" gate circuits 32 via the one-shot timers 20. The "AND" gate circuits 32 generate a trip command output signal for the particular phase 13 corresponding to the sudden current-change elements 19-A, 19-B or 19-C in operation, if a reverse ground fault has not been detected and if the permission signal from the remote terminal has been received. The outputs of the "AND" gate circuits 32 are received by the "OR" gate circuit 17. The "OR" gate circuit 17 is activated when a trip output command is sent to any of the phases. The output of the "OR" gate circuit 17 is sent out to the remote terminal as a permission signal via the permission signal sending unit 18.

According to the seventh embodiment described above, the faulty phase is selected to be opened, by utilizing the permission signals from the ground fault reverse detection element and from the remote terminal.

[Eighth Embodiment]

Figure 19:
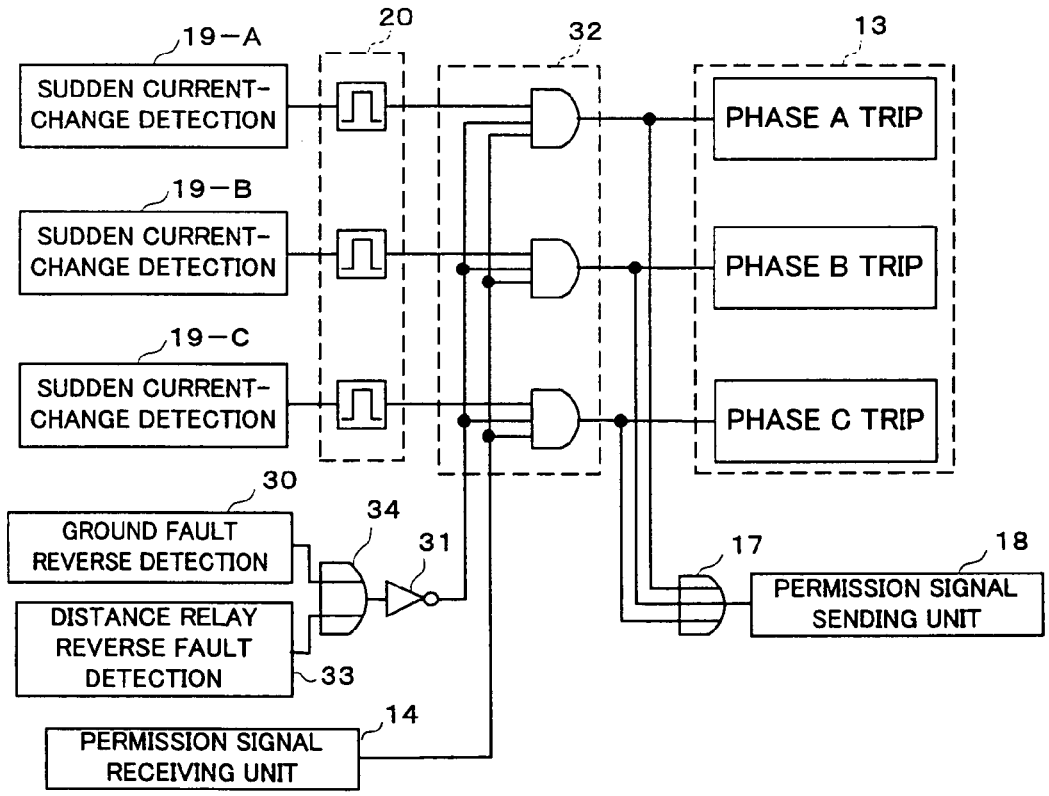
FIG. 19 is a block diagram showing a logic sequence circuit for generating trip command output signals in an eighth embodiment according to the present invention.

An eighth embodiment according to the present invention is described referring to FIG. 19. The eighth embodiment is similar to the seventh embodiment shown in FIG. 18 except that a reverse fault detection element 33 of a distance relay having a directional element as well as ground fault reverse detection element is added for detecting a reverse fault. The reverse fault detection element 33 decides the direction of the fault based upon the voltage and the current which have been detected from the power transmission system to be protected.

The outputs of the ground fault reverse detection element 30 and the reverse fault detection element 33 of the distance relay are received by an "OR" gate circuit 34. The output of the "OR" gate circuit 34 is received and reversed by the "NOT" gate circuit 31. Then the output of the "NOT" gate circuit 31 is received by the "AND" gate circuits 32. The other parts of logic are the same as the seventh embodiment shown in FIG. 18.

According to the eighth embodiment described above, the three conditions are utilized: neither the reverse fault detection element 33 of the distance relay nor the ground fault reverse detection element 30 are in operation; the sudden current-change elements 19-A, 19-B or 19-C are in operation; and the permission signal from the remote terminal is received. Thus the directional decision is made more accurately than the seventh embodiment, and the circuit breakers at the local terminal may be tripped.

[Ninth Embodiment]

Figure 20:
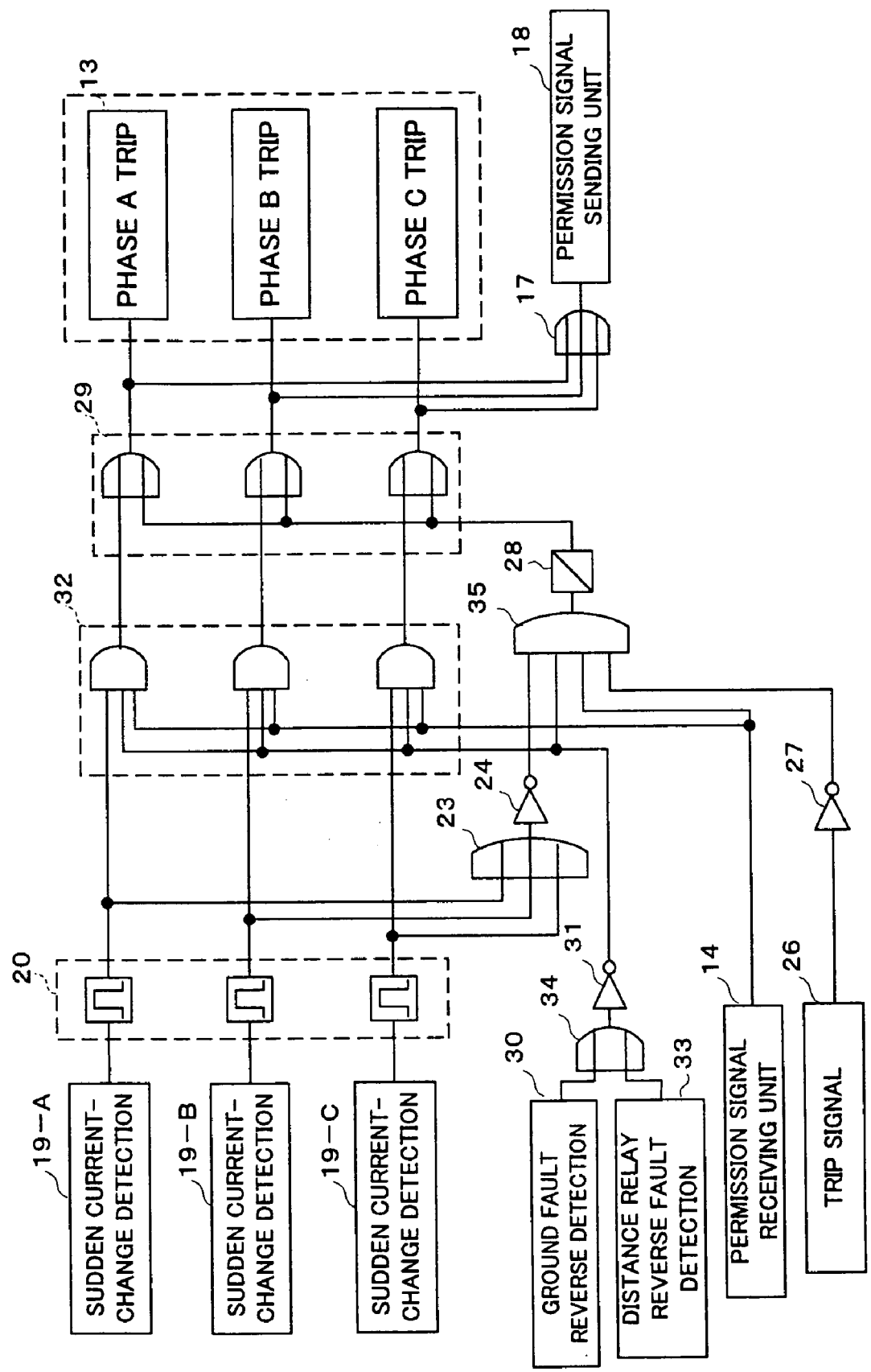
FIG. 20 is a block diagram showing a logic sequence circuit for generating trip command output signals in a ninth embodiment according to the present invention.

A ninth embodiment according to the present invention is described referring to FIG. 20. The ninth embodiment is substantially a combination of the fourth embodiment shown in FIG. 13 and the eighth embodiment shown in FIG. 19.

An added "AND" gate circuit 35 shown in FIG. 20 receives the outputs of the "NOT" gate circuits 24 and 27 shown in FIG. 13 and the outputs of the "NOT" gate circuit 31 and the permission signal receiving unit 14 shown in FIG. 19.

This "AND" gate circuit 35 is in operation only when four conditions are satisfied, which are: none of the sudden current-change relays for phases 19-A, 19-B and 19-C are activated; neither of relays 30 nor 33 described above have detected a reverse fault; there is not a trip signal 26 at the local terminal; and a permission signal from the remote terminal has been received. Only when the "and" condition is satisfied, the "AND" gate circuit 35 sends an operational output to the "OR" gate circuit 29 via the confirmation timer 28, and the trip signals 13 for all phases are sent out from the "OR" gate circuits 29.

When the condition is satisfied for a trip signal for any phases, a permission signal is output from the "OR" gate circuit 17 to the remote terminal via the permission signal sending unit 18.

According to the ninth embodiment, three-phase tripping is achieved by receiving the permission signal from the remote terminal, even if the sudden current-change elements 19 may not be activated and if the reverse fault is not detected.

Numerous modifications and variations of the present invention are possible in light of the above teachings. It is, therefore, to be understood that, within the scope of the appended claims, the present invention may be practiced in a manner other than as specifically described herein.

This application is based upon and claims the benefits of priority from the prior Japanese Patent Applications No. 2002-233451, filed on Aug. 9, 2002; the entire content of which is incorporated herein by reference.

What is claimed is:

1. A directional ground relay configured to receive a plurality of electric values relating to voltage and current from a three-phase electric power transmission line to be protected, the directional ground relay being configured to decide a direction of a fault in the power transmission line based upon the plurality of electric values, the directional ground relay comprising:

a zero-phase sequential current calculation unit configured to calculate a zero-phase sequential current based upon the current detected from the power transmission line; and a phase-comparison unit configured to compare the phase of the zero-phase sequential current to the phase of any phase voltage, to decide whether the phase of the zero-phase sequential current is within a predetermined range, and to output the phase of the voltage as a faulty phase of voltage in which a forward ground fault has occurred, when the phase of the zero-phase sequential current is within the pre-determined range.

2. The directional ground relay according to claim 1, further comprising:

an absolute-value comparison unit configured to decide whether the zero-phase sequential current is equal to or greater than a pre-determined value; and a forward-fault decision unit configured to decide that a forward ground fault has occurred and to output the phase of the voltage as a faulty phase of voltage in which a forward ground fault has occurred, when the zero-phase sequential current is decided as within the pre-determined range by the phase-comparison unit, and when the zero-phase sequential current is decided as equal to or greater than a pre-determined value by the absolute-value comparison unit.

3. A directional ground relay system comprising:
a directional ground relay configured to calculate a zero-phase sequential current and a zero-phase sequential voltage based upon electric values relating to voltage and current detected from a three-phase electric power transmission line to be protected, the directional ground relay being configured to decide a direction of a ground fault in the power transmission line based upon a phase relation of the zero-phase sequential current and a zero-phase sequential voltage;
an sudden current-change relay configured to be activated when a phase current has changed at a rate more rapid than a pre-determined rate; and
a faulty phase decision unit configured to decide that a phase corresponding to the activated sudden current-change relay is a phase in which the fault has occurred, when the ground fault is decided to be a forward fault by the directional ground relay.

4. A directional ground relay system comprising:
a first directional ground relay configured to receive a plurality of electric values relating to voltage and current from a three-phase electric power transmission line to be protected, the directional ground relay being configured to decide a direction of a fault in the power transmission line based upon the plurality of electric values, the directional ground relay comprising:
a zero-phase sequential current calculation unit configured to calculate a zero-phase sequential current based upon the current detected from the power transmission line; and a phase-comparison unit configured to compare a phase of the zero-phase sequential current to a phase of voltage corresponding to the voltage in the power transmission line, to decide whether the zero-phase sequential current is within a pre-determined range, and to output the phase of the voltage as a faulty phase of voltage in which a forward ground fault has occurred, when the zero-phase sequential current is within the pre-determined range;
a second directional ground relay configured to calculate a zero-phase sequential current and a zero-phase sequential voltage based upon electric values relating to voltage and current detected from the power transmission line, the directional ground relay being configured to decide a direction of a ground fault in the power transmission line based upon a phase relation of the zero-phase sequential current and a zero-phase sequential voltage; and
a faulty phase decision unit configured to decide that a phase in which the first ground directional relay is activated is a faulty phase, when the second directional ground relay decides a forward fault.

5. The directional ground relay system according to claim 4, wherein the first directional ground relay further comprising:
an absolute-value comparison unit configured to decide whether the zero-phase sequential current is equal to or greater than a pre-determined value; and
a forward-fault decision unit configured to decide that a forward ground fault has occurred and to output the phase of the voltage as a faulty phase of voltage in which a forward ground fault has occurred, when the zero-phase sequential current is decided as within the pre-determined range by the phase-comparison unit, and when the zero-phase sequential current is decided as equal to or greater than a pre-determined value by the absolute-value comparison unit.

6. A directional ground relay system comprising:
a directional ground relay configured to calculate a zero-phase sequential current and a zero-phase sequential voltage based upon electric values relating to voltage and current detected from a three-phase electric power transmission line to be protected, the directional ground relay being configured to decide a direction of a ground fault in the power transmission line based upon a phase relation of the zero-phase sequential current and a zero-phase sequential voltage;
a transmitter and a receiver configured to exchange signals between a local terminal and a remote terminal; and
an sudden current-change relay configured to be activated when a phase current has changed at a rate more rapid than a pre-determined rate;
wherein the system is configured to output a trip signal of a local terminal to the output phase of the sudden current-change relay and to transmit a permission signal to the remote terminal, if a permission signal is received from a relay of the remote terminal, and if the directional ground relay has not detected a reverse fault.

7. The directional ground relay system according to claim 6, further comprising:
a reverse fault detection element of a distance relay configured to decide a fault direction based upon the electric values relating to voltage and current detected from the power transmission line,
wherein the system is configured to output the trip signal of the local terminal to the output phase of the sudden current-change relay and to transmit the permission signal to the remote terminal, if the permission signal is received from the relay of the remote terminal, and if neither the directional ground relay nor the reverse fault detection element of the distance relay has detected a reverse fault.

* * * * *